(12) United States Patent
Wakeman

(10) Patent No.: US 6,649,871 B2
(45) Date of Patent: Nov. 18, 2003

(54) WELDING SYSTEM HAVING WELDING GUN WITH HAND/WRENCH TIGHTENED RETAINING NUT

(75) Inventor: Robert W. Wakeman, Watertown, SD (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/014,629

(22) Filed: Oct. 26, 2001

(65) Prior Publication Data

US 2003/0080102 A1 May 1, 2003

(51) Int. Cl.[7] .................................................. B23K 9/00
(52) U.S. Cl. .................................................. 219/137.31
(58) Field of Search ...................... 219/137.31, 137.41, 219/137.42, 137.43, 137.44, 137.51, 137.52, 137.61, 137.62, 137.63

(56) References Cited

U.S. PATENT DOCUMENTS

| | | | | | |
|---|---|---|---|---|---|
| 4,158,763 | A | * | 6/1979 | Moerke | 219/137.42 |
| 4,297,561 | A | * | 10/1981 | Townsend et al. | 219/137.63 |
| 5,278,392 | A | * | 1/1994 | Takacs | 219/137.43 |
| 5,384,447 | A | * | 1/1995 | Raloff et al. | 219/137.31 |

* cited by examiner

*Primary Examiner*—M. Alexandra Elve
*Assistant Examiner*—Kevin P. Kerns
(74) *Attorney, Agent, or Firm*—Fletcher Yoder

(57) ABSTRACT

A welding system having a welding gun. The welding gun having a neck, a handle and a retaining nut for securing the neck to the handle. The retaining nut consists essentially of a polymeric material. The polymeric material may be polyphenylene sulfide (PPS).

27 Claims, 3 Drawing Sheets

WELDING SYSTEM HAVING WELDING GUN WITH HAND/WRENCH TIGHTENED RETAINING NUT

FIELD OF THE INVENTION

The present invention relates generally to welding systems, and particularly to a welding system having a welding gun.

BACKGROUND OF THE INVENTION

Welding is a method of joining pieces of metal together into one solid piece. Welding guns are used in a number of different types of welding. For example, welding guns are typically used in arc welding. An arc welding system typically comprises an electric power supply coupled to a welding gun that houses an electrode. The electric power supply typically includes a conductive cable and a clamp for securing the conductive cable to the metal piece to be welded. The electrode in the welding handle, along with the metal piece and conductive cable, completes an electrical circuit with the power supply when the electrode is placed against the metal piece. The contact between the electrode and the metal piece produces an electric arc between the electrode and the metal piece. The heat of the electric arc is concentrated on the metal piece, or pieces, to be joined. The heat of the arc melts the metal piece, or pieces. A filler material is added to the molten metal. The molten mass then cools and solidifies into one piece, joining the metal pieces.

MIG (Metal Inert Gas) welding is one type of arc welding. MIG welding is also referred to as "wire-feed" or GMAW (Gas Metal Arc Welding). In MIG welding, a metal wire is used as the electrode to produce the arc. Electricity passing through the electrode wire melts the workpiece at the point of contact. Additionally, the electrode wire acts as the filler for the weld. The electrode wire is shielded at the point of contact by an inert gas. The inert gas shields the molten metal at the point of contact from outside contaminants and gases that may react with the molten material. Non-inert gases, such as $CO_2$, also may be used in MIG welding systems.

The wire and gas are typically fed through a welding cable and a hand-held welding gun. The welding cable feeds the wire from a wire feeder and gas from a gas cylinder to the welding gun. The welding cable also has additional conductors to assist the wire in conducting power from the power source. The welding gun has a neck that is used to direct gas and wire toward a workpiece. The neck is connected to a connector in the welding gun. The neck has an inner portion through which the electrode wire passes and which is electrically coupled to the conductors in the welding cable when the neck is secured to the welding gun. The inner portion of the neck, in turn, is electrically coupled to the electrode wire via a conductive tip. The neck has an outer portion and insulating material disposed between the inner and outer portions so that the outer portion is electrically isolated from the inner portion.

The welding gun enables a user to control the welding process. The welding gun, typically, has a switch, or trigger, that is coupled to the wire feeder. When the trigger is operated, gas and wire are fed to the welding gun from the gas cylinder and wire feeder via the welding cable. Additionally, the power source applies electrical power to the electrode wire and to the conductors in the welding cable. A first portion of the current flows through the electrode wire in the welding cable. A second portion of the current flows through the conductors in the welding cable, to the inner portion of the neck, and then merges with the first portion of the current in the electrode wire at the tip.

Submerged Arc Welding is another type of wire fed arc welding. In submerged arc welding, a granular flux, rather than a gas, is used. Typically, the flux is fed from a reservoir to the welding gun through a power source coupled to a wire feeder. As in MIG welding, the electrode wire is fed from the wire feeder. The electrode wire completes the electrical circuit and creates an arc to melt the object metal. In submerged arc welding, the actual point of metal fusion and the arc are submerged within flux, not gas. Typically, the flux is a granular composition of chemical and metallic materials that is continuously deposited just ahead of the electrode. The electrical current melts the electrode to form the weld puddle. The portion of the flux that is adjacent to the electrode tip and the puddle will melt, forming a slag layer that refines the weld and excludes air.

As in MIG welding, the welding handle, typically, has a switch, or trigger, that is coupled to the power source/wire feeder. When the trigger is operated, the flux and wire are fed to the workpiece through the welding gun. The welding gun also has a neck that is used to direct wire and/or flux toward a workpiece. The neck electrically couples the conductors in the welding cable to the wire, typically, at a point on the wire near the end of the neck. When the welding gun trigger is operated, flux and wire are fed to the welding gun from the flux reservoir and wire feeder via the welding cable. Additionally, power is applied to the electrode wire and to the conductors in the welding cable.

In both of these systems, the neck is secured to the welding handle by a retaining nut. The retaining nut secures the neck to the welding gun so that electricity can flow from the welding cable to the inner portion of the neck. There are different types of retaining nuts used to secure welding gun necks to a welding handle. Some retaining nuts are made of a nylon piece with a threaded brass insert. The welding handle has a corresponding threaded portion adapted for threaded engagement with the brass insert. The nylon serves as an insulator to prevent electricity from flowing through the retaining nut. If the retaining nut loosens, the area of contact between the neck and the handle will decrease. This increases the electrical resistance between the neck and the welding cable. In some applications, such as with electrical currents above 400 amps, the increase in electrical resistance results in the production of a substantial amount of resistive heating. The heat from the resistive heating produced at the interface may heat up the handle to the point where it cannot be held.

Consequently, it may be desirable to wrench tighten the retaining nut to the welding handle so that neck does not come loose. A normal torque generated to hand-tighten a retaining nut is in the range of 5–6 foot-pounds (ft-lbs). However, the normal torque generated to wrench-tighten a retaining nut is in the range of 35–40 ft-lbs. The low tensile strength of the nylon prevents a retaining nut made of nylon with a brass insert from being tightened to this range of torque using a wrench. Therefore, in the applications where wrench-tightening is desired the retaining nuts are made of metal, such as copper. However, metal retaining nuts are electrically conductive. Consequently, an electrical insulator is typically placed between the electrode wire and the retaining nut to prevent electricity from flowing from the electrode wire through the neck to the retaining nut. Additionally, metals, such as copper, are more expensive than polymeric materials, such as nylon.

There exists a need for a retaining nut that be may formed of a polymeric material, but which has sufficient strength to enable a neck to be secured to a welding handle by wrench tightening the retaining nut.

SUMMARY OF THE INVENTION

The present technique provides a novel retaining nut designed to respond to such needs. According to one aspect of the present technique, the retaining nut consists essentially of a polymeric material. The polymeric material may be polyphenylene sulfide (PPS). In another aspect of the present technique, the retaining nut comprises polyetheretherketone (PEEK).

According to still another aspect of the present technique, a welding gun is featured. The welding gun has a handle and a neck. The handle is used to position the welding gun and the neck is used to direct electrode wire towards a workpiece. The neck is secured to the handle by a retaining nut. In this aspect of the present technique, the retaining nut consists essentially of a polymeric material, such as polyphenylene sulfide (PPS).

A welding system is featured in yet another aspect of the present technique. The welding system has a power source and a wire feeder for feeding electrode wire to a welding gun. The wire feeder is electrically coupled to the power source to enable the electrode wire to complete an electrical circuit with the power source through a workpiece. The welding gun has a handle and a neck. The neck is used to direct the feeding of electrode wire from the welding gun. The handle is used to position the welding gun so that the wire is directed towards a desired location. The neck is secured to the handle by a retaining nut. The retaining nut consists essentially of a polymeric material, such as polyphenylene sulfide (PPS).

A method of securing a neck to a handle of a welding gun is featured in another aspect of the present technique. The neck of the welding gun is disposed in proximity to the handle. The retaining nut is then threaded onto a corresponding portion of the handle. The retaining nut is comprised essentially of a polymeric material. However, the polymeric material of the retaining nut enables the retaining nut to be tightened onto the handle with a wrench.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
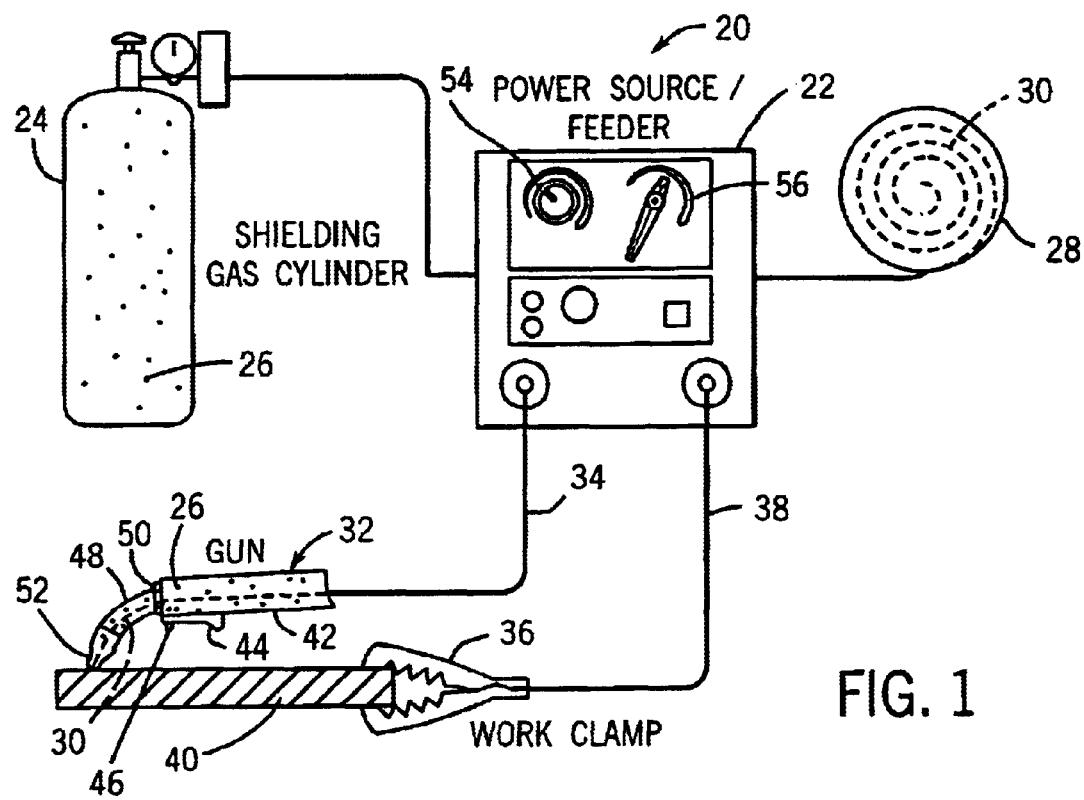
FIG. 1 is a diagram of a MIG welding system, according to an exemplary embodiment of the present technique.

Referring generally to FIG. 1, an exemplary metal inert gas ("MIG") welding system 20 is illustrated. However, the present technique also is operable with other types of welding systems, such as submerged arc welding systems. The illustrated welding system 20 comprises a power source/feeder 22, a gas cylinder 24 containing a gas 26 that is coupled to the power source/feeder 22, a spool 28 of electrode wire 30 that is coupled to the power source/feeder 22, a welding gun 32, a welding cable 34, a work clamp 36, and a ground cable 38. The power source/feeder 22 is a source of electric power. Additionally, the power source/feeder 22 directs the feeding of gas 26 and wire 30 to the welding cable 34. The welding cable 34 is operable to route the gas 26 and the wire 30 to the welding gun 32. Additionally, the welding cable 34 has a plurality of conductors that, along with the electrode wire 30, couple electricity from the power source 22 to the welding gun 32. The additional conductors protect the electrode wire from having to carry the entire electrical current load, which could lead to failure of the electrode wire. In addition, the additional conductors reduce resistive heating losses. The work clamp 36 is clamped onto the conductive workpiece 40 to be welded. The work clamp 36 and the ground cable 38 electrically couple the power source/feeder 22 to the workpiece 40. Additionally, the wire 30 within the welding cable 34 is electrically coupled to the power source/feeder 22.

The welding gun 32 is used to direct the wire to the workpiece 40 and to control the supply of gas 26 and wire 30 from the power source/feeder 22 to the workpiece 40. When the wire 30 is touched to the workpiece 40, the electrical circuit is completed. Electricity from the power source 22 flows through the wire 30 and workpiece 40, producing an arc. The electric arc produces heat that melts the workpiece 40 in a region surrounding the point of contact between the wire 30 and the workpiece 40. The wire 30 also acts as filler material. The heat of the arc melts the wire 30 along with the workpiece 40. The inert gas 26 forms a shield that prevents harmful chemical reactions from occurring at the weld site. When the arc is removed, the workpiece 40 and the filler material solidify, forming the weld.

Figure 2:
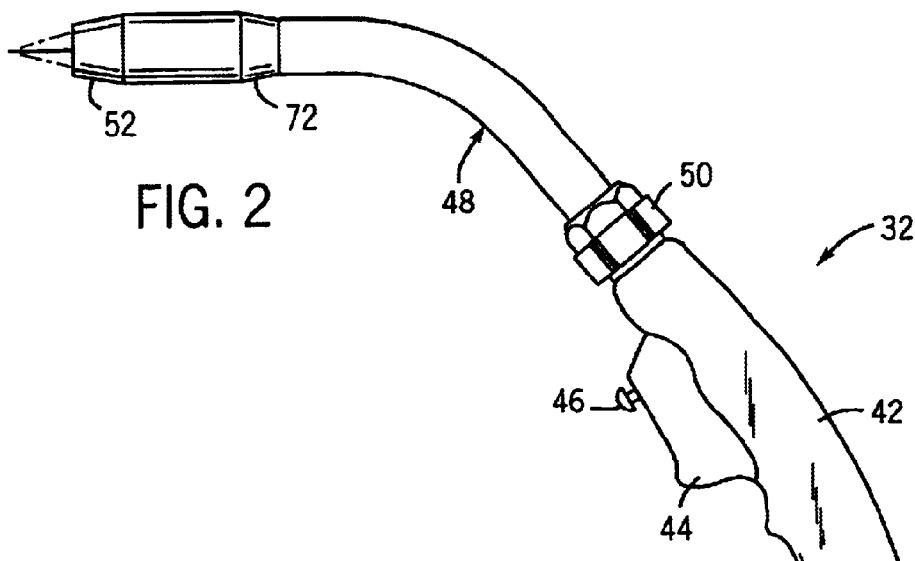
FIG. 2 is a front elevational view of a welding gun, according to an exemplary embodiment of the present technique.

As best illustrated in FIG. 2, the welding gun 32 comprises a handle 42, a trigger 44, a trigger lock 46, a neck 48, a retaining nut 50, and a nozzle 52. The welding cable 34 also has an electrical cable (not shown) that is electrically coupleable to the trigger 44. The trigger 44 enables a user to control the supply of gas 26, wire 30 and power from the power source/feeder 22. A number of events occur when the trigger 44 is operated. One event is that the power source/feeder 22 draws in wire 30 from the wire spool 28 and feeds it though the welding cable 34 to the welding gun 32. Additionally, gas 26 from the gas cylinder 24 flows through the welding cable 34 to the welding gun 32. Also, electric power from the power source/feeder 22 is supplied to the wire 30 and the conductors in the welding cable 34. The wire 30 and gas 26 are then fed through the neck 48. The nozzle 52 directs the wire 30 and gas 26 towards the workpiece 40.

The trigger lock 46 is operable to secure the trigger 44 engaged so that a user need not actively hold the trigger 44 engaged during prolonged periods of operation. When the trigger 44 is released, gas 26, wire 30, and electrical power are no longer fed to the welding gun 32. A voltage control 54 and a wire speed control 56 are provided to enable a user to vary the voltage applied to the electrode wire 30 by the power source/feeder 22 and the speed that the wire 30 is fed from the power source/feeder 22.

Figure 4:
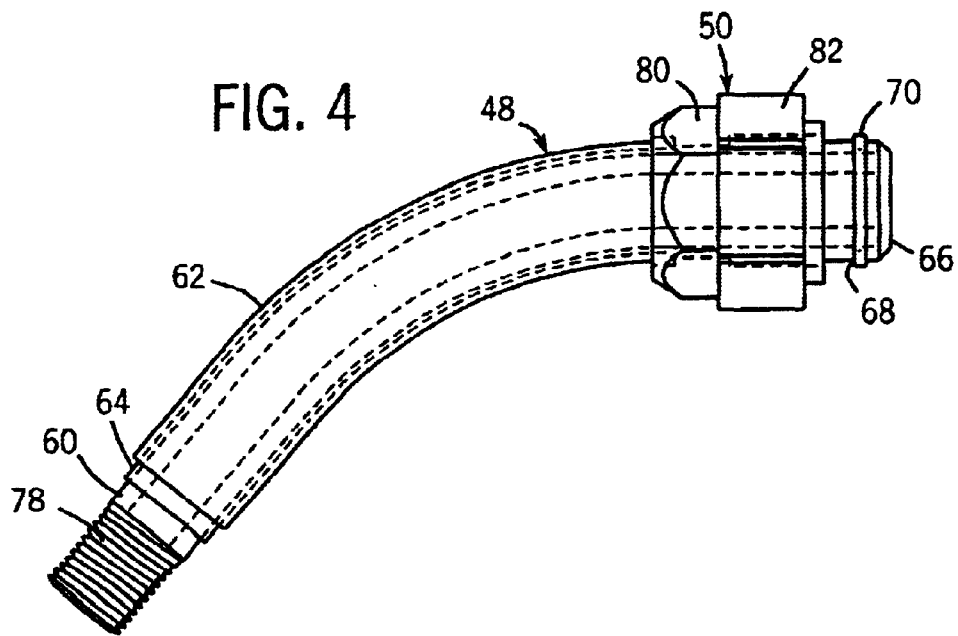
FIG. 4 is an elevational view of a welding gun neck and retaining nut, according to an exemplary embodiment of the present technique.
Figure 3:
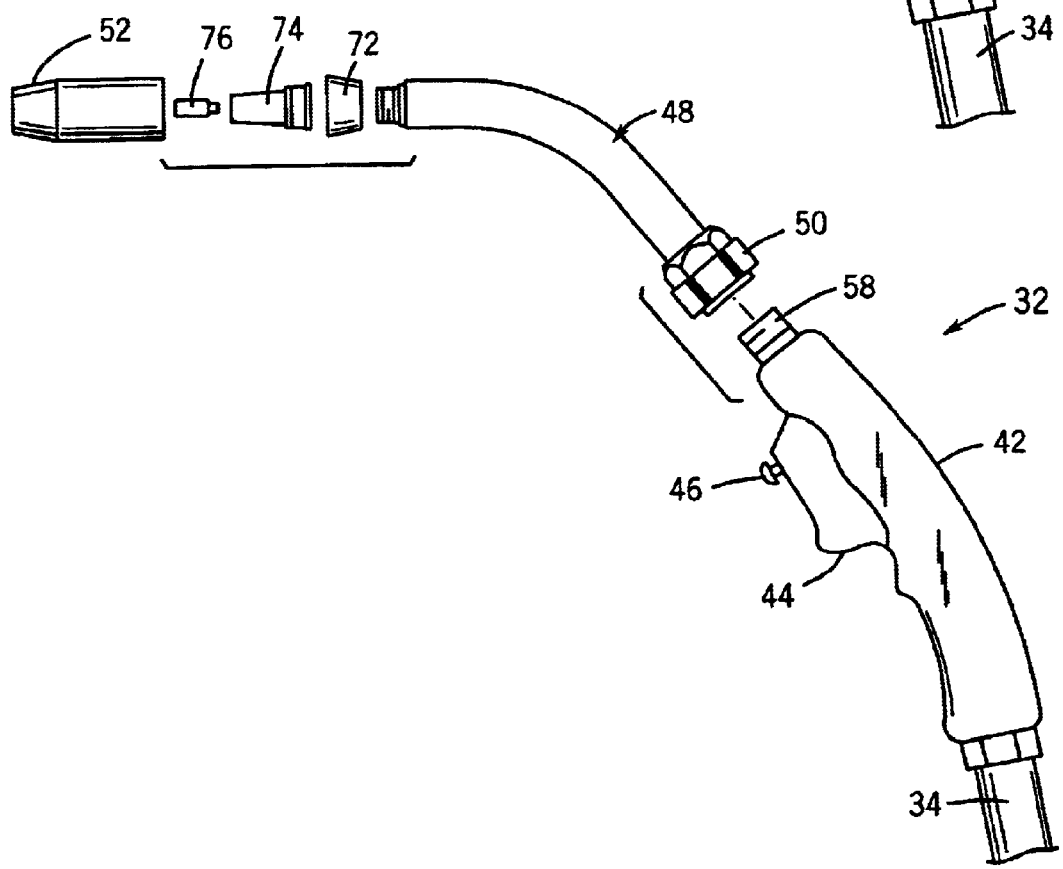
FIG. 3. is an exploded view of the neck of the welding handle, according to an exemplary embodiment of the present technique.
Figure 7:
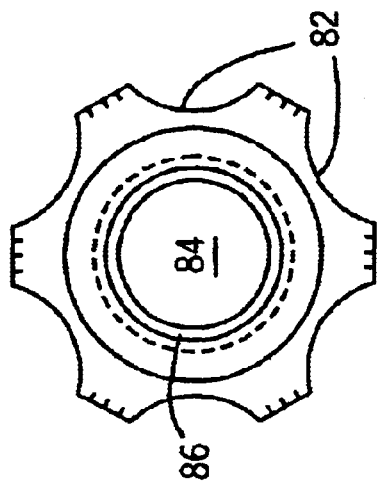
FIGS. 6 and 7 are opposite end views of the retaining nut of FIG. 5.
Figure 5:
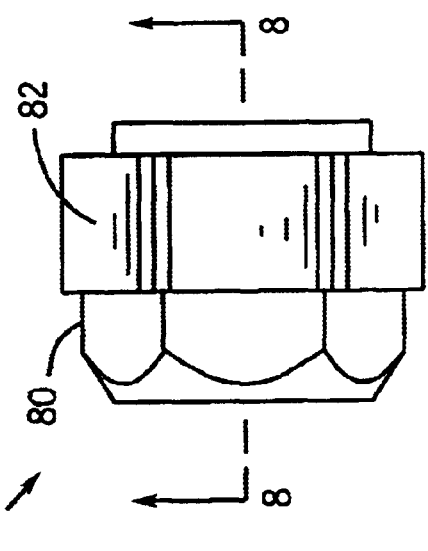
FIG. 5 is an elevational view of a retaining nut, according to an exemplary embodiment of the present technique.
Figure 8:
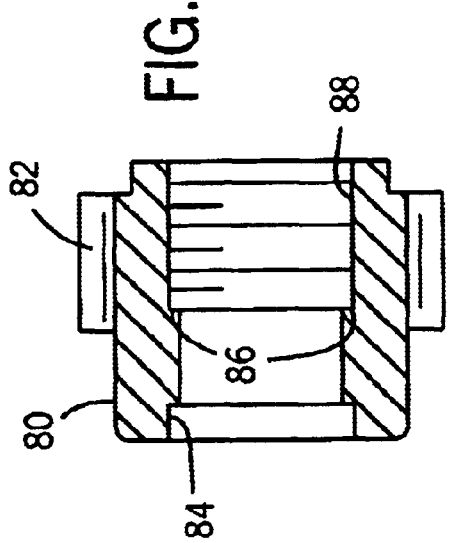
FIG. 8 is a cross-sectional view of the retaining nut, taken generally along line 8—8 of FIG. 5.
Figure 6:
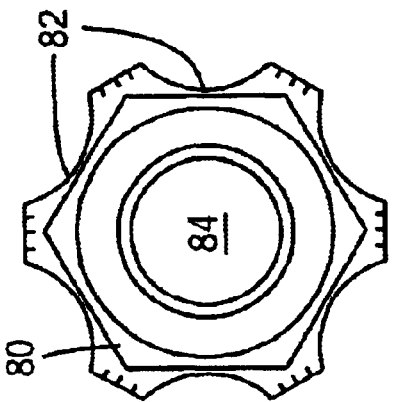

Referring generally to FIGS. 3 and 4, the neck 48 is secured to the welding handle 42 by threading the retaining nut 50 onto a threaded portion 58 of the welding gun 32. Before the retaining nut 50 is threaded onto the threaded portion of the neck 48, the retaining nut 50 is free to move along the neck 48. The threaded portion 58 may be a connector secured to the handle 42 or an end portion of the cable 34. In the illustrated embodiment, the threaded portion 58 is adapted to receive the neck 48 into the threaded portion 58 so that gas 26 and electrode wire 30 may be routed from the welding cable 34 into the neck 48.

As best illustrated in FIG. 4, the neck 48 has a hollow inner portion 60, an outer portion 62, and an electrical insulator 64 between the inner and outer portions. The hollow inner portion 62 of the neck is electrically coupled to the conductors in the welding cable 34 when the neck 48 is secured to the connector 58. The electrical insulator 64 electrically isolates the outer portion 62 from the inner portion 60.

To secure the neck 48 to the handle 42, an end portion 66 of the neck 48 is placed within the threaded portion 58 of the handle 42. The retaining nut 50 then is threaded onto the threaded portion 58 of the handle 42. The neck 48 is adapted with a groove 68 in which is placed a snap ring 70. A portion of the retaining nut 50 abuts the snap ring 68 as the retaining nut 50 is tightened onto the threaded portion 58 of the handle 42. As the retaining nut 50 is tightened, the retaining nut 50 drives the snap ring 68 towards the handle 42, securing the neck 48 to the handle 42. Tightening the retaining nut 50 also drives the end portion 66 of the neck 48 into the threaded portion 58 of the handle 42.

As best illustrated in FIG. 3, at the opposite end of the neck 48 are the nozzle 52, an insulator 72, a diffuser 74, and a tip 76. The inner portion 60 of the neck 48 has a threaded portion 78 that is adapted for threaded engagement with the nozzle 52. The insulator 72 is used to prevent electricity in the nozzle 52 from flowing to the welding handle 38 through the outer portion 62 of the neck 48. The diffuser 74 is used to establish the desired flow characteristics of the gas 26, e.g., a desired pressure. The tip 76 is disposed within the inner portion 60 of the neck 48. The tip 76 is used to guide the wire 30 and to electrically couple the electrode wire 30 to the inner portion 60 of the neck 48. The nozzle 52 is used to direct the gas 26 and wire 30 to the workpiece 40.

Referring generally to FIGS. 5–8, the illustrated retaining nut 50 is adapted to be tightened by hand and by wrench. However, the retaining nut may be adapted for tightening only by hand or only by a wrench. The retaining nut 50 has a plurality of flat faces 80. In the illustrated embodiment, the flat faces 80 are arranged in a typical hexagonal arrangement for operation by a wrench. However, the number of faces and the arrangement may vary. In addition, the retaining nut 50 has a plurality of indentations 82. Each indentation is adapted to receive a finger so that the retaining nut 50 may be threaded by hand. The illustrated retaining nut 50 has a central opening 84 that enables the retaining nut 50 to be disposed around the neck 48. The retaining nut 50 has a lip, or edge, 86 that forms an abutment surface for contact with the snap ring 70. The retaining nut 50 also has a threaded portion 88 that is adapted to engage the threaded portion 58 of the handle 42.

The illustrated embodiment of the retaining nut 50 consists of a polymeric material that is strong enough to withstand a torque of at least 35–40 ft-lbs. Preferably, the retaining nut 50 is formed using a molding process. However, the retaining nut 50 may be formed using a different manufacturing process, such as by machining the retaining nut from a block of polymeric material. Preferably, the polymeric material is polyphenylene sulfide (PPS). PPS is a thermoplastic that consists of a chain of repeating units having the chemical formula: $C_6H_4S$. PPS has mechanical properties that enable the retaining nut 50 to be wrench-tightened to the desired torque, as well as hand-tightened. PPS has a yield stress of approximately 9,993 pounds per square inch (psi) and an ultimate tensile stress of approximately 12,575 psi. PPS also has an Izod impact strength of approximately 0.86 ft-lbs/inch and a Charpy impact strength of 1.7 ft-lbs/inch. In addition, PPS has an electrical resistivity of approximately $8.7 \times 10^{15}$ Ohm-cm, making it a good electrical insulator.

The retaining nut 50 may consist of another polymeric material that is strong enough to enable the retaining nut to be wrench-tightened to at least 35–40 ft-lbs. For example, the retaining nut may be polyetheretherketone (PEEK). PEEK also is a thermoplastic. PEEK consists of a chain of repeating units having the chemical formula: $C_{19}H_2O_3$. PEEK also has mechanical properties that enable the retaining nut 50 to be wrench-tightened, as well as hand-tightened. PEEK has an ultimate tensile stress of approximately 11,531 psi and an Izod impact strength of approximately 1.8 ft-lbs/inch.

The various components described herein may be provided in a kit form so that an existing welding system may be refitted. For example, an embodiment of the retaining nut may be provided so that it may replace an existing retaining nut on a welding gun. Additionally, a neck and a retaining nut may be provided so that an existing neck and retaining nut may be replaced. Other combinations may also be provided. In addition, a replacement connector for a welding cable, or a modification thereof, may also be provided to enable a replacement nut to secure to the welding cable. Similarly, if the welding gun has a separate connector, a replacement connector, or a modification thereof, may be provided.

It will be understood that the foregoing description is of preferred exemplary embodiments of this invention, and that the invention is not limited to the specific forms shown. For example, the retaining nut may be formed of another polymeric material, other than PPS or PEEK, having the mechanical strength to enable the retaining nut to be wrench-tightened. Additionally, the polymeric material may have additional polymeric material added to the PPS or PEEK. The retaining nut also may have other non-essential, non-polymeric material that does not interfere with the essential function of the polymeric material of the retaining nut, i.e., securing a welding neck to a welding gun. The retaining nut also may be adapted for tightening by hand only, or by wrench only. These and other modifications may be made in the design and arrangement of the elements without departing from the scope of the invention as expressed in the appended claims.

What is claimed is:

1. A welding gun, comprising:
   a welding cable;
   a neck; and
   a retaining nut adapted to secure the neck to the welding cable, the retaining nut consisting essentially of a polymeric material.

2. The welding gun as recited in claim 1, wherein the polymeric material comprises polyphenylene sulfide (PPS).

3. The welding gun as recited in claim 1, wherein the retaining nut is adapted with a plurality of faces for engagement by a wrench.

4. The welding gun as recited in claim 3, wherein the retaining nut is adapted for manipulation by digits of a hand.

5. An arc welding system, comprising:

a power source;

a wire feeder for feeding electrode wire, the wire feeder being electrically coupled to the power source;

a welding gun operable to receive the electrode wire from the wire feeder; comprising:

a neck operable to direct the electrode wire; and a retaining nut adapted to secure the neck to the welding gun, the retaining nut consisting essentially of a polymeric material.

6. The arc welding system as recited in claim 5, wherein the polymeric material comprises polyphenylene sulfide (PPS).

7. The arc welding system as recited in claim 5, comprising a welding cable having a connector, wherein the retaining nut is operable to secure the neck to the connector.

8. The arc welding system as recited in claim 5, wherein the arc welding system is a metal inert gas (MIG) welding system.

9. The arc welding system as recited in claim 5, wherein the arc welding system is a submerged arc welding system.

10. A method of securing a neck of a welding gun to a welding cable of the welding gun, comprising the acts of:

disposing the neck proximate to the welding cable;

threading a retaining nut consisting essentially of a polymeric material onto a corresponding threaded piece secured to the welding cable; and tightening the retaining nut onto the corresponding threaded piece with a wrench.

11. The method as recited in claim 10, wherein threading comprises rotating a portion of the retaining nut adapted for manual manipulation using digits of a hand.

12. The method as recited in claim 10, wherein tightening comprises disposing the wrench around a portion of the retaining nut adapted for manipulation by a wrench.

13. The method of claim 10, wherein tightening comprises applying a torque of at least 35 foot-pounds.

14. A kit for an arc welding system, comprising:

a neck adapted to couple electricity from a welding cable to an electrode wire disposed therein; and a retaining nut adapted to secure the neck to a welding gun, the retaining nut consisting essentially of a polymeric material.

15. The kit as recited in claim 14, wherein the retaining nut is adapted to secure the neck to a portion of the welding cable.

16. The kit as recited in claim 15, comprising a plurality of handle pieces that are securable to the welding cable to form a handle.

17. A welding gun, comprising:

a welding cable having a first end and a second end, the first end being couplable to an electrode wire feeder;

a neck having a hollow inner portion adapted to receive an electrode wire from the second end of the welding cable therethrough; and a retaining nut adapted to secure the neck to the welding cable, the retaining nut consisting essentially of a polymeric material.

18. The welding gun of claim 17, wherein the retaining nut is operable to withstand a torque of at least 35 foot-pounds.

19. The welding gun of claim 17, wherein the neck further comprises a hollow outer portion adapted to receive a gas.

20. The welding gun of claim 17, wherein the neck further comprises an insulation layer disposed between the inner portion and the outer portion.

21. The welding gun of claim 17, wherein the neck further comprises:

a groove; and a snap ring disposed within the groove, the snap ring adapted to engage the nut, wherein engagement of the nut against the snap ring biases the neck towards the welding cable.

22. The welding cable of claim 17, wherein the second end of the welding cable and the retaining nut are correspondingly threaded.

23. The welding gun of claim 17, wherein the polymeric material comprises polyphenylene sulfide (PPS).

24. The welding gun of claim 17, wherein the polymeric material comprises polyetheretherketone (PEEK).

25. A welding gun, comprising:

a welding cable having a threaded connector;

a neck having a receiving end, the receiving end adapted to mate with the welding cable; and a retaining nut having a polymeric threaded portion adapted for mating engagement with the threaded connector, wherein the retaining nut mates to the threaded connector under a wrench applied torque.

26. The welding gun of claim 25, wherein the polymeric material comprises polyphenylene sulfide (PPS).

27. The welding gun of claim 25, wherein the wrench applied torque comprises a torque of at least 35 foot-pounds.

* * * * *